United States Patent
Karve et al.

(10) Patent No.: US 9,262,143 B2
(45) Date of Patent: Feb. 16, 2016

(54) METHOD AND APPARATUS FOR TEMPLATE-BASED PROVISIONING IN A SERVICE DELIVERY ENVIRONMENT

(75) Inventors: Alexei Karve, Mohegan Lake, NY (US); Ajay Mohindra, Yorktown Heights, NY (US); Randy Allan Rendahl, Raleigh, NC (US); Alla Segal, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 915 days.

(21) Appl. No.: 12/541,760

(22) Filed: Aug. 14, 2009

(65) Prior Publication Data

US 2009/0300184 A1 Dec. 3, 2009

Related U.S. Application Data

(62) Division of application No. 11/753,956, filed on May 25, 2007, now abandoned.

(51) Int. Cl.
G06F 15/173 (2006.01)
G06F 9/445 (2006.01)

(52) U.S. Cl.
CPC ........................................ *G06F 8/60* (2013.01)

(58) Field of Classification Search
CPC ..... H04L 29/06; H04L 61/2015; H04L 61/10; H04L 21/577; A01B 12/006
USPC ................................................. 709/226, 223
See application file for complete search history.

(56) References Cited

U.S. PATENT DOCUMENTS

| | | |
|---|---|---|
| 6,487,718 B1 | 11/2002 | Rodriguez et al. |
| 7,389,339 B1 | 6/2008 | Dobberpuhl et al. |
| 2004/0039728 A1* | 2/2004 | Fenlon et al. ..................... 707/1 |
| 2005/0004942 A1* | 1/2005 | Madsen et al. ............. 707/104.1 |
| 2005/0278694 A1 | 12/2005 | Butler et al. |
| 2005/0283759 A1 | 12/2005 | Peteanu et al. |
| 2006/0059253 A1 | 3/2006 | Goodman et al. |
| 2006/0080412 A1 | 4/2006 | Oprea et al. |
| 2006/0080413 A1* | 4/2006 | Oprea et al. .................. 709/220 |
| 2006/0245354 A1 | 11/2006 | Gao et al. |
| 2006/0271928 A1 | 11/2006 | Gao et al. |
| 2007/0294364 A1* | 12/2007 | Mohindra et al. ............ 709/217 |

OTHER PUBLICATIONS

"Rainforest Project," http:/www.research.ibm.com/rainforest/index.html, pg, Apr. 4, 2007.
Heiko Ludwig, "Template-Based Automated Service Provisioning—Supporting the Agreement-Driven Service Life-Cycle" Service-Oriented Computing—ICSOC 2005 (Dec. 12-15, 2005), pp. 283-295.

* cited by examiner

*Primary Examiner* — Phuoc Nguyen
(74) *Attorney, Agent, or Firm* — F. Chau & Associates, LLC (57) ABSTRACT

A method for automated provisioning of computing resources in a distributed computing network includes obtaining a data structure representing a resource dependency characterization of an application to be implemented over the distributed computing network, wherein the data structure indicates a set of resources to be deployed, obtaining a template that represents a predefined network topology for supporting deployment of the set of resources, mapping the set of resources represented in the data structure to the template so as to satisfy a set of component requirements to generate a deployment map, and provisioning the set of resources on a plurality of computers based on the deployment map to implement the application over the distributed computing network.

4 Claims, 7 Drawing Sheets

METHOD AND APPARATUS FOR TEMPLATE-BASED PROVISIONING IN A SERVICE DELIVERY ENVIRONMENT

CROSS REFERENCE TO RELATED APPLICATIONS

This application is a Divisional Application of U.S. application Ser. No. 11/753,956, filed on May 25, 2007, the disclosure of which is herein incorporated by reference in its entirety.

BACKGROUND OF THE INVENTION

1. Field of the Invention

The present disclosure relates to computer network management and, more particularly, to methods and apparatus for providing template-based provisioning in a distributed computing environment.

2. Description of Related Art

A variety of deployment topologies have been utilized to deploy an increasingly wide range of services on servers. Common topologies include simple deployment with a single-point of failure, Web-tier only cluster deployment, business-tier only cluster deployment, database-tier only cluster deployment, single-site highly available deployment and multi-site highly available deployment. Selection of a deployment topology may be based on requirements for scalability, redundancy and networking. For example, a deployment may consist of a Web tier and a database tier. The Web tier may consist of a single Web server or multiple Web servers functioning as a cluster. The database tier may consist of SQL database servers. Additionally, each tier may have domain controllers for authentication and DNS services.

The deployment topology affects the ease with which system hardware and software can be updated. Each topology has associated costs, monetary and otherwise, such as hardware costs, software licensing fees and management complexity, and a certain level of quality of service measured in terms of performance, availability and security. In conventional approaches, the design and realization of deployment solutions is a manual, costly and error-prone process.

The "Rainforest Project," an International Business Machines Corporation (IBM) published document describes a three-stage automated deployment process. In the first stage, an automated search is employed to generate a deployment topology that offers a good tradeoff between cost and quality relative to an input set of deployment objectives. In the second stage, planning techniques are employed to generate a deployment plan that when executed deploys the service in accordance with the deployment topology design. In the third stage, the plan is executed to actually deploy and configure the service.

Provisioning is the process of deploying, installing, uninstalling, upgrading and configuring application services or otherwise implementing changes for hardware, software, network and/or storage resources. The term "provisioning" has been used to refer to low-level provisioning of servers or other resources, e.g., installing and configuring operating systems, as well as to high-level application provisioning, i.e., installing, updating and configuring applications on resources that have undergone low-level provisioning. Provisioning in a service delivery environment that supports a variety of deployment topologies incorporating varying numbers of servers can be a challenging task. In the conventional approaches, provisioning solutions are directly mapped, fixed infrastructure in the service delivery environment.

Applications to be implemented over a distributed computing environment can be considered to be composed of multiple elements which are distinct deployable units. In conventional approaches, once a deployment mapping has been developed, it can be difficult to change the mapping to accommodate alternative topologies and to adapt to changes in the delivery environment. A need exists for methodologies that simplify the provisioning process in distributed computing environments.

SUMMARY OF THE INVENTION

According to an exemplary embodiment of the present invention, a method for automated provisioning of computing resources in a distributed computing network includes obtaining a data structure representing a resource dependency characterization of an application to be implemented over the distributed computing network, wherein the data structure indicates a set of resources to be deployed, obtaining a template that represents a predefined network topology for supporting deployment of the set of resources, mapping the set of resources represented in the data structure to the template so as to satisfy a set of component requirements to generate a deployment map, and provisioning the set of resources on a plurality of computers based on the deployment map to implement the application over the distributed computing network.

According to an exemplary embodiment of the present invention, a system for automated provisioning of computing resources in a distributed computing network includes a memory device for storing a program of instructions, a processor in communication with the memory device, the processor operative with the program of instructions to obtain a data structure representing a resource dependency characterization of an application to be implemented over the distributed computing network, wherein the data structure indicates a set of resources to be deployed, obtain a template that represents a predefined network topology for supporting deployment of the set of resources, map the set of resources represented in the data structure to the template so as to satisfy a set of component requirements to generate a deployment map, and provision the set of resources on a plurality of computers based on the deployment map to implement the application over the distributed computing network.

According to an exemplary embodiment of the present invention, a method for automated provisioning of software components in a distributed computing network includes obtaining a mapping of a set of resources to nodes of a first template, the first template having a plurality of nodes that follow a first predefined network topology for supporting a first deployment of the set of resources, obtaining a second template having a plurality of nodes that follow a second predefined network topology for supporting a second deployment of the set of resources, migrating the set of resources represented in the nodes of the first template to the nodes in the second template so as to satisfy a set of component requirements to generate a redeployment map, and provisioning the set of resources on a plurality of computers based on the deployment map to implement an application over the distributed computing network.

According to an exemplary embodiment of the present invention, a system for automated provisioning of software components in a distributed computing network includes a memory device for storing a program of instructions, a processor in communication with the memory device, the processor operative with the program of instructions to obtain a mapping of a set of resources to nodes of a first template, the first template having a plurality of nodes that follow a first predefined network topology for supporting a first deployment of a set of resources, obtain a second template having a plurality of nodes that follow a second predefined network topology for supporting a second deployment of the set of resources, migrate the set of resources represented in the nodes of first template to the nodes in the second template so as to satisfy a set of component requirements to generate a deployment map, and provision the set of resources on a plurality of computers based on the redeployment map to implement an application over the distributed computing network.

The present invention will become readily apparent to those of ordinary skill in the art when descriptions of exemplary embodiments thereof are read with reference to the accompanying drawings.

DESCRIPTION OF EXEMPLARY
EMBODIMENTS

Hereinafter, exemplary embodiments of the present invention will be described with reference to the accompanying drawings. It is to be understood that exemplary embodiments of the present invention described herein may be implemented in various forms of hardware, software, firmware, special purpose processors, or a combination thereof. An exemplary embodiment of the present invention may take the form of an entirely hardware embodiment, an entirely software embodiment or an embodiment containing both hardware and software elements. An exemplary embodiment may be implemented in software as an application program tangibly embodied on one or more program storage devices, such as for example, computer hard disk drives, CD-ROM (compact disk-read only memory) drives and removable media such as CDs, DVDs (digital versatile discs or digital video discs), Universal Serial Bus (USB) drives, floppy disks, diskettes and tapes, readable by a machine capable of executing the program of instructions, such as a computer. The application program may be uploaded to, and executed by, an instruction execution system, apparatus or device comprising any suitable architecture. It is to be further understood that since exemplary embodiments of the present invention depicted in the accompanying drawing figures may be implemented in software, the actual connections between the system components (or the flow of the process steps) may differ depending upon the manner in which the application is programmed.

Figure 1:
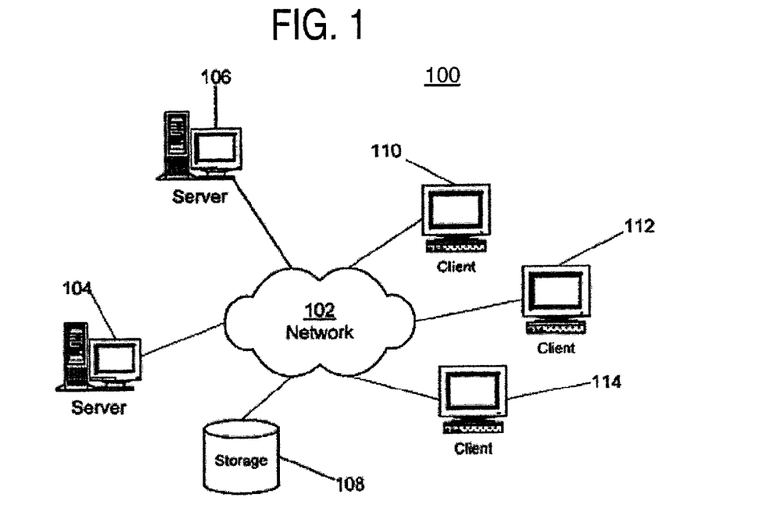
FIG. 1 depicts a pictorial representation of a network data processing system, which may be used to implement an exemplary embodiment of the present invention.

FIG. 1 depicts a pictorial representation of a network data processing system, which may be used to implement an exemplary embodiment of the present invention. Network data processing system 100 includes a network of computers, which can be implemented using any suitable computers. Network data processing system 100 may include, for example, a personal computer, workstation or mainframe. Network data processing system 100 may employ a client-server network architecture in which each computer or process on the network is either a client or a server.

Network data processing system 100 includes a network 102, which is a medium used to provide communications links between various devices and computers within network data processing system 100. Network 102 may include a variety of connections such as wires, wireless communication links, fiber optic cables, connections made through telephone and/or other communication links.

A variety of servers, clients and other devices may connect to network 102. For example, a server 104 and a server 106 may be connected to network 102, along with a storage unit 108 and clients 110, 112 and 114, as shown in FIG. 1. Storage unit 108 may include various types of storage media, such as for example, computer hard disk drives, CD-ROM drives and/or removable media such as CDs, DVDs, USB drives, floppy disks, diskettes and/or tapes. Clients 110, 112 and 114 may be, for example, personal computers and/or network computers.

Client 110 may be a personal computer. Client 110 may comprise a system unit that includes a processing unit and a memory device, a video display terminal, a keyboard, storage devices, such as floppy drives and other types of permanent or removable storage media, and a pointing device such as a mouse. Additional input devices may be included with client 110, such as for example, a joystick, touchpad, touchscreen, trackball, microphone, and the like.

Clients 110, 112 and 114 may be clients to server 104, for example. Server 104 may provide data, such as boot files, operating system images, and applications to clients 110, 112 and 114. Network data processing system 100 may include other devices not shown.

Network data processing system 100 may comprise the Internet with network 102 representing a worldwide collection of networks and gateways that use the Transmission Control Protocol/Internet Protocol (TCP/IP) suite of protocols to communicate with one another. The Internet includes a backbone of high-speed data communication lines between major nodes or host computers consisting of a multitude of commercial, governmental, educational and other computer systems that route data and messages.

Network data processing system 100 may be implemented as any suitable type of networks, such as for example, an intranet, a local area network (LAN) and/or a wide area network (WAN). The pictorial representation of network data processing elements in FIG. 1 is intended as an example, and not as an architectural limitation for embodiments of the present invention.

Figure 2:
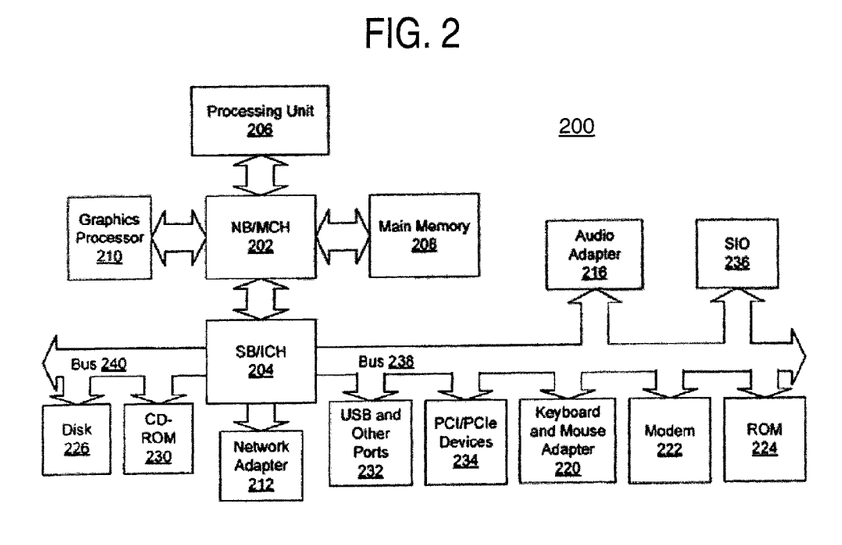
FIG. 2 is a block diagram of a data processing system, which may be used to implement an exemplary embodiment of the present invention.

FIG. 2 is a block diagram of a data processing system, which may be used to implement an exemplary embodiment of the present invention. Data processing system 200 is an example of a computer, such as server 104 or client 110 of FIG. 1, in which computer usable code or instructions implementing processes of embodiments of the present invention may be located.

In the depicted example, data processing system 200 employs a hub architecture including a north bridge and memory controller hub (NB/MCH) 202 and a south bridge and input/output (I/O) controller hub (SB/ICH) 204. Processing unit 206 that includes one or more processors, main memory 208, and graphics processor 210 are coupled to the north bridge and memory controller hub 202. Graphics processor 210 may be coupled to the NB/MCH 202 through an accelerated graphics port (AGP). Data processing system 200 may be, for example, a symmetric multiprocessor (SMP) system including a plurality of processors in processing unit 206. Data processing system 200 may be a single processor system.

In the depicted example, local area network (LAN) adapter 212 is coupled to south bridge and I/O controller hub 204. Audio adapter 216, keyboard and mouse adapter 220, modem 222, read only memory (ROM) 224, universal serial bus (USB) ports and other communications ports 232, and PCI/PCIe (PCI Express) devices 234 are coupled to south bridge and I/O controller hub 204 through bus 238, and hard disk drive (HDD) 226 and CD-ROM drive 230 are coupled to south bridge and I/O controller hub 204 through bus 240.

Examples of PCI/PCIe devices include Ethernet adapters, add-in cards, and PC cards for notebook computers. In general, PCI uses a card bus controller while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system, which may run on processing unit 206, coordinates and provides control of various components within data processing system 200. For example, the operating system may be a commercially available operating system such as Microsoft® Windows® XP (Microsoft and Windows are trademarks or registered trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java and all Java-based marks are trademarks or registered trademarks of Sun Microsystems, Inc. in the United States, other countries, or both).

Instructions for the operating system, object-oriented programming system, applications and/or programs of instructions are located on storage devices, such as for example, hard disk drive 226, and may be loaded into main memory 208 for execution by processing unit 206. Processes of exemplary embodiments of the present invention may be performed by processing unit 206 using computer usable program code, which may be located in a memory, such as for example, main memory 208, read only memory 224 or in one or more peripheral devices.

It will be appreciated that the hardware depicted in FIGS. 1 and 2 may vary depending on the implementation. Other internal hardware or peripheral devices, such as flash memory, equivalent non-volatile memory, or optical disk drives and the like, may be used in addition to or in place of the depicted hardware. Processes of embodiments of the present invention may be applied to a multiprocessor data processing system.

Data processing system 200 may take various forms. For example, data processing system 200 may be a tablet computer, laptop computer, or telephone device. Data processing system 200 may be, for example, a personal digital assistant (PDA), which may be configured with flash memory to provide non-volatile memory for storing operating system files and/or user-generated data. A bus system within data processing system 200 may include one or more buses, such as a system bus, an I/O bus and PCI bus. It is to be understood that the bus system may be implemented using any type of communications fabric or architecture that provides for a transfer of data between different components or devices coupled to the fabric or architecture. A communications unit may include one or more devices used to transmit and receive data, such as modem 222 or network adapter 212. A memory may be, for example, main memory 208, ROM 224 or a cache such as found in north bridge and memory controller hub 202. A processing unit 206 may include one or more processors or CPUs.

Methods for automated provisioning according to exemplary embodiments of the present invention may be performed in a data processing system such as data processing system 100 shown in FIG. 1 or data processing system 200 shown in FIG. 2.

It is to be understood that a program storage device can be any medium that can contain, store, communicate, propagate or transport a program of instructions for use by or in connection with an instruction execution system, apparatus or device. The medium can be, for example, an electronic, magnetic, optical, electromagnetic, infrared, or semiconductor system (or apparatus or device) or a propagation medium. Examples of a program storage device include a semiconductor or solid state memory, magnetic tape, removable computer diskettes, RAM (random access memory), ROM (read-only memory), rigid magnetic disks, and optical disks such as a CD-ROM, CD-R/W and DVD.

A data processing system suitable for storing and/or executing a program of instructions may include one or more processors coupled directly or indirectly to memory elements through a system bus. The memory elements can include local memory employed during actual execution of the program code, bulk storage, and cache memories that provide temporary storage of at least some program code to reduce the number of times code must be retrieved from bulk storage during execution.

Data processing system 200 may include input/output (I/O) devices, such as for example, keyboards, displays and pointing devices, which can be coupled to the system either directly or through intervening I/O controllers. Network adapters may also be coupled to the system to enable the data processing system to become coupled to other data processing systems or remote printers or storage devices through intervening private or public networks. Network adapters include, but are not limited to, modems, cable modem and Ethernet cards.

Figure 3:
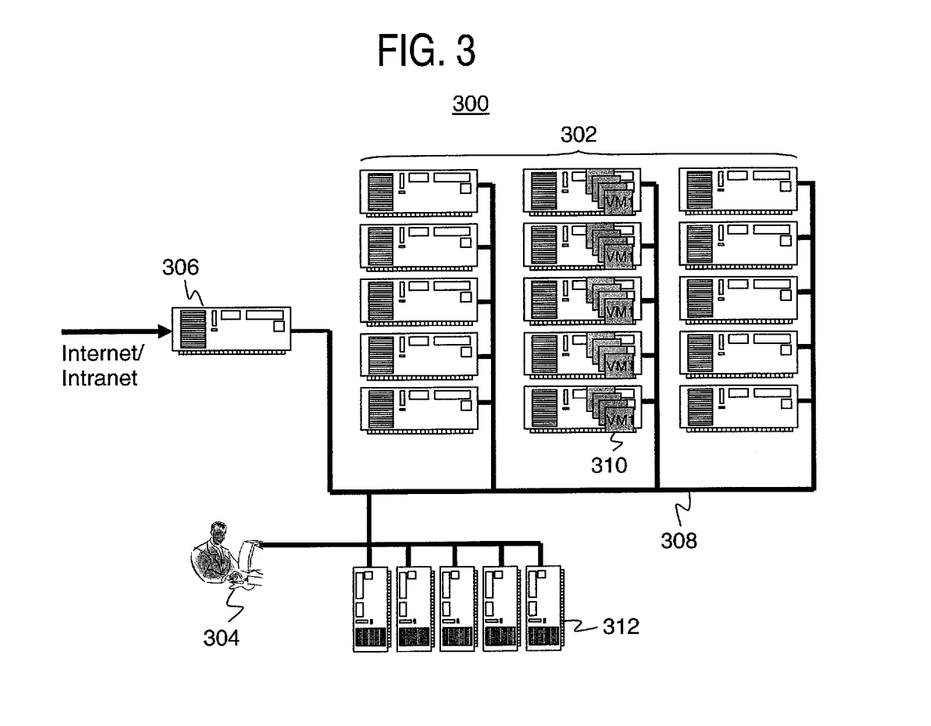
FIG. 3 depicts a schematic representation of a service delivery environment, which may be used to implement an exemplary embodiment of the present invention.

FIG. 3 depicts a schematic representation of a service delivery environment, which may be used to implement an exemplary embodiment of the present invention. Referring to FIG. 3, service delivery environment 300 includes a farm of physical servers 302, DMZ (demilitarized zone) 306 and management servers 312. The term "demilitarized zone" or acronym "DMZ" refers to a network area that sits between an organization's internal network and an external network, such as the Internet.

User requests from the Internet or an intranet are received by a router device. For example, a router device may be located within the DMZ 306. The router device may be implemented by a reverse proxy, such as IBM's WebSeal product.

User requests may be directed via network 308 to a provisioning solution that is hosted on a collection of real or virtual machines 310 running on the server farm 302. Management servers 312 that may be used to manage the server farm 302 are coupled via network 308 to the physical servers 302. The management servers 312 may be used by system administrators 304 to manage and monitor the server farm. Software running on the management servers 312 may assist with various tasks such as software metering, application provisioning, monitoring all (or selected) applications, and problem determination of the server farm.

Figure 4:
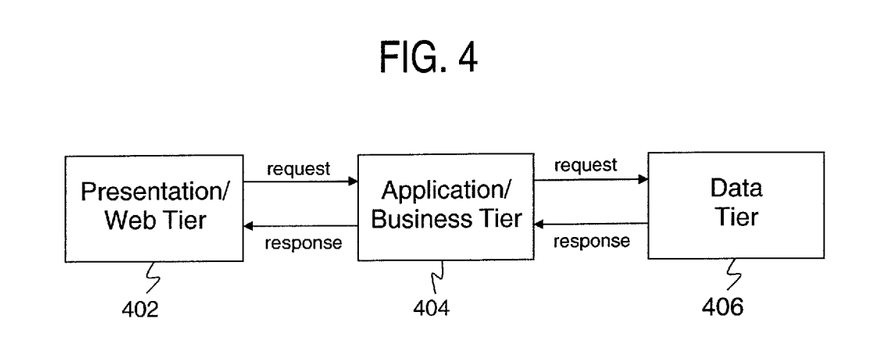
FIG. 4 is a block diagram illustrating an example of a multi-tier model, which may be used to implement an exemplary embodiment of the present invention.

FIG. 4 is a block diagram illustrating an example of a multi-tier, which may be used to implement an exemplary embodiment of the present invention. The depicted model is a three-tier model. Each tier may be multi-tiered itself (in which case the overall architecture is called an "n-tier architecture"). The logical tiers can be physically implemented in different ways. For example, all three tiers may be physically implemented on different servers, which can lead to greater scalability and an ability to process more client requests simultaneously.

Referring to FIG. 4, the first tier is the presentation or Web tier, which dynamically generates content in various formats for the user. The presentation tier consists of components that handle interactions between users and the business tier. User interactions with the presentation tier may be via a Web browser. A Web browser that supports an HTML-based front end, for example, communicates with a Web server, which forwards back a modified or new Web page to the user. It will be appreciated that a Web server can employ different approaches to service a user request. These approaches include, but are not limited to, the Common Gateway Interface (CGI), Microsoft's Active Server Page (ASP), and the Java Server Page (JSP). Presentation tier components may include HTML pages, images and computer readable code to display and process the HTML pages such as portlets and/or servlets.

The second tier is the application or business tier. The components of the business tier process the client requests and provide the business logic for an application. Business logic is computer readable code that provides functionality to a particular application domain. It may be embodied by the actual J2EE (Java 2 Platform, Enterprise Edition) application or a business process that performs functionality specific to a provisioning solution.

The third tier is the database tier. The database tier contains data and components to manage and provide access to the data, such as database management software.

Figure 5:
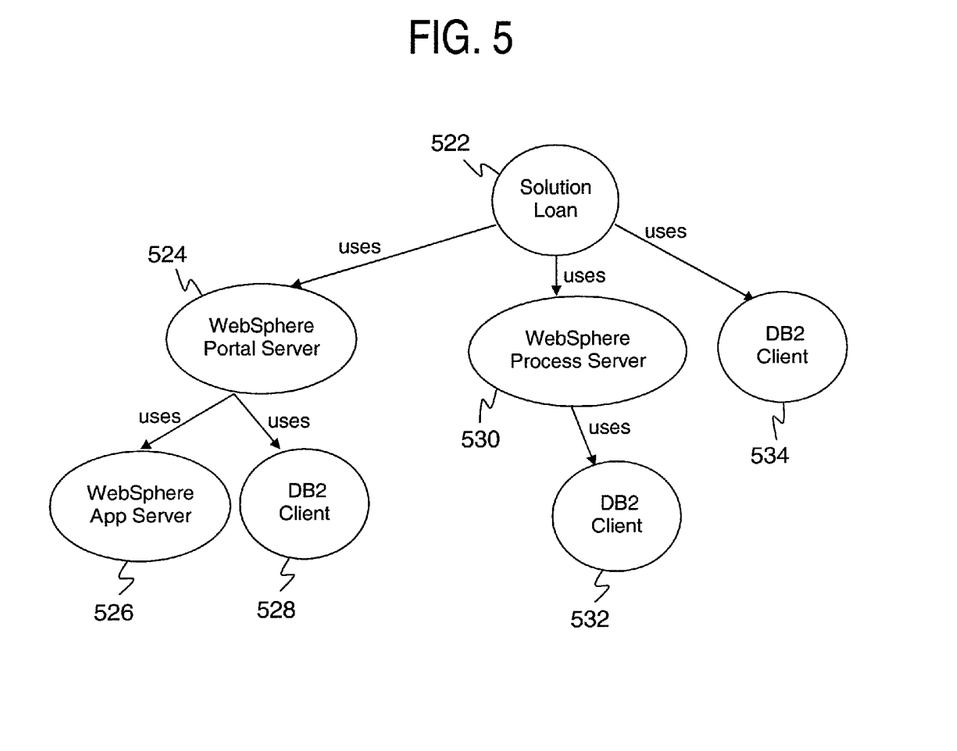
FIG. 5 depicts an example of a logical application structure containing a resource dependency characterization of a sample application, according to an exemplary embodiment of the present invention.

FIG. 5 depicts an example of a logical application structure containing a resource dependency characterization of a sample application, according to an exemplary embodiment of the present invention. Referring to FIG. 5, the example logical application structure is a dependency graph containing resource dependency characteristics of the sample application. However, it is to be understood that any suitable logical application structure may be employed.

A dependency graph may be expressed as an XML file that highlights the relationships and dependencies between different components. In the example depicted in FIG. 5, the "Loan Solution" 522 largely depends on the availability of three components, WebSphere Portal Server 524, WebSphere Process Server 530 and DB2 server 534. The WebSphere Portal Server 524 depends on the availability of WebSphere Application Server 526 and DB2 client 528. The WebSphere Process Server depends upon DB2 client 532.

Figure 6A:
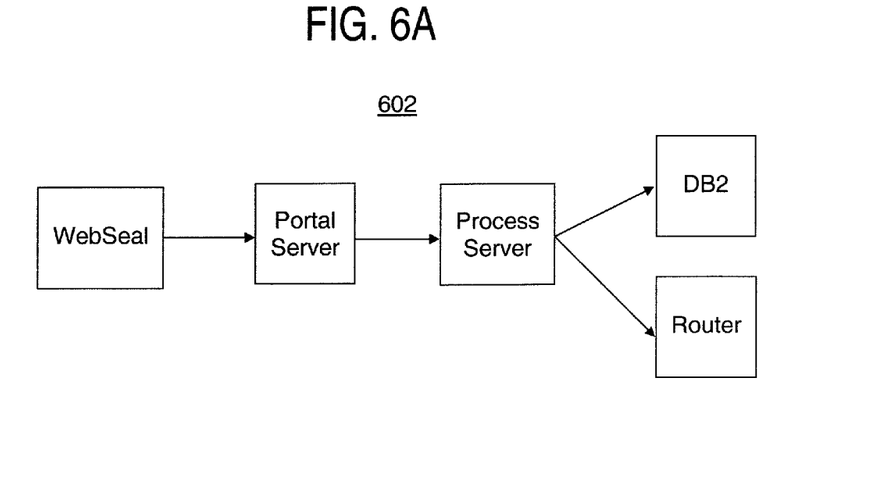
FIGS. 6A through 6C are block diagrams illustrating templates, according to exemplary embodiments of the present invention.
Figure 6B:
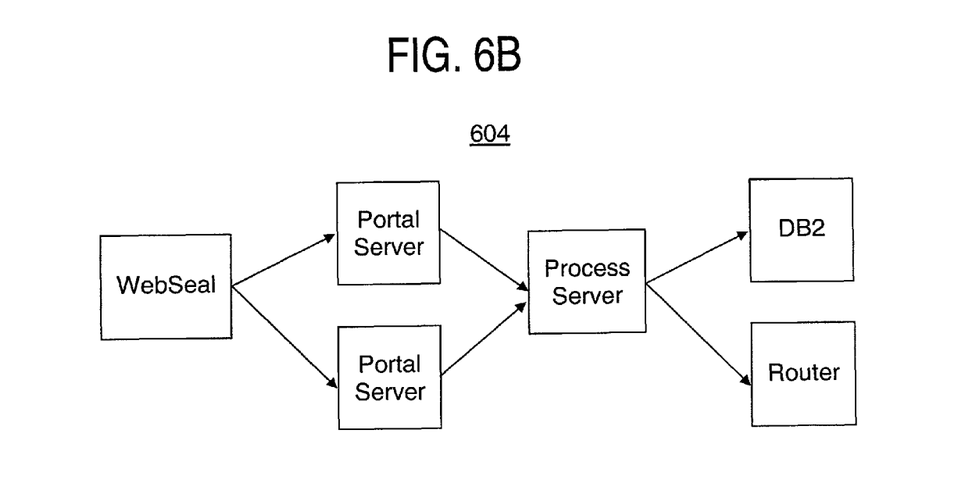
Figure 6C:
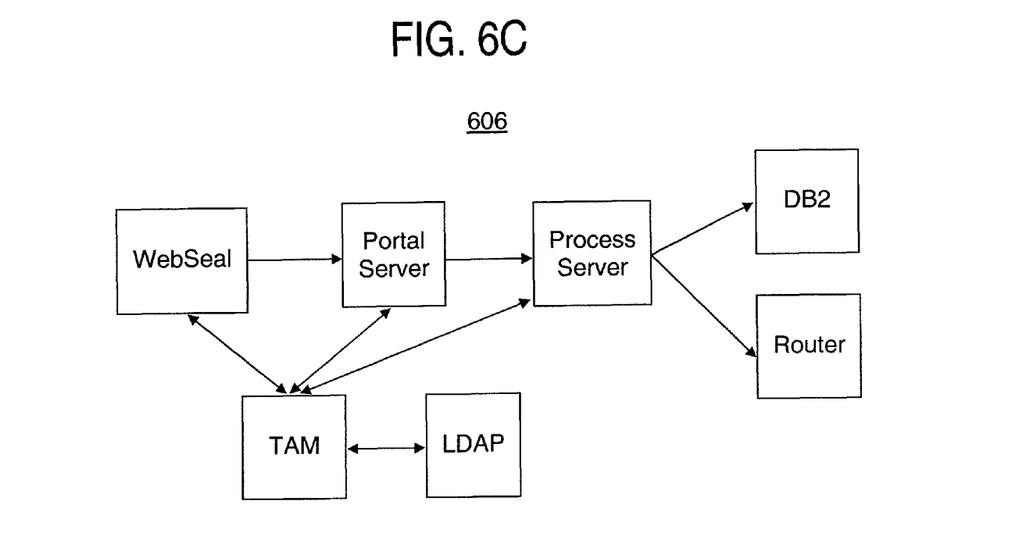

FIGS. 6A through 6C are block diagrams illustrating templates, according to exemplary embodiments of the present invention. A template can be considered as a generic representation of a desirable configuration for the deployment of different types of elements, such as may be found in an application. In FIGS. 6A through 6C, for each template, the nodes (represented by boxes) follow a predefined network topology (illustrated by the arrowed lines). A template may be used to represent multi-tiered applications or service.

A template may include various types of information. Multiple templates can be generated and stored in a repository.

Referring to FIG. 6A, a simple template 602 may consist of a single instance each of a portal server, process server, database server and a router. Each node in the simple template 602 follows a predefined network topology, as illustrated by the arrowed lines connecting the nodes. The database server may be, for example, IBM's DB2 database management system, which runs on devices ranging from handhelds to mainframes.

Referring to FIG. 6B, a Web-tier only cluster template 604 may consist of an incoming WebSeal router, multiple portal servers, a single process server, a single DB2 server and a router. Each node in the Web-tier only cluster template 604 follows a predefined network topology, as illustrated by the arrowed lines connecting the nodes.

Referring to FIG. 6C, secure deployment template 606 may consist of a simple template, such as that shown in FIG. 6A, augmented by security servers of TAM and LDAP. Each node in the secure deployment template 606 follows a predefined network topology, as illustrated by the arrowed lines connecting the nodes.

An example of the provisioning of computing resources in a distributed computing network, according to an exemplary embodiment of the present invention, will be described with reference to FIGS. 5 and 6B. Referring to FIG. 5 logical application structure contains a resource dependency characterization of a "Loan Solution" 522. In this example scenario, resources represented in the logical application structure of FIG. 5 will be assigned to the template 604 of FIG. 6B.

The WebSphere Portal Server 524 component is assigned to Portal Server in template 604. Here, the WebSphere Portal Server 524 component is assigned in a cluster configuration, as there are two nodes for the Portal Server in template 604. The WebSphere Process Server 530 component is assigned to the Process Server component in template 604. Any database specific configuration scripts for the provisioning solution are assigned to the DB2 server, while any router specific configuration scripts are assigned to the router in template 604. For example, these scripts may be included in the provisioning-solution artifact.

The DB2 client 528 and 532 is configured to point to the DB2 server node in template 604. In this example, there is no component assigned to the WebSeal node in template 604; however, the WebSeal node is configured to enable access to the deployed application. After the assignments (or "mapping") is complete, physical resources are allocated to provision the resources to implement an application over the distributed computing network. As used herein, the term "physical resources" refers to physical or virtual components, such as for example, physical memory, virtual memory, physical server or virtual environment, etc.

Figure 7:
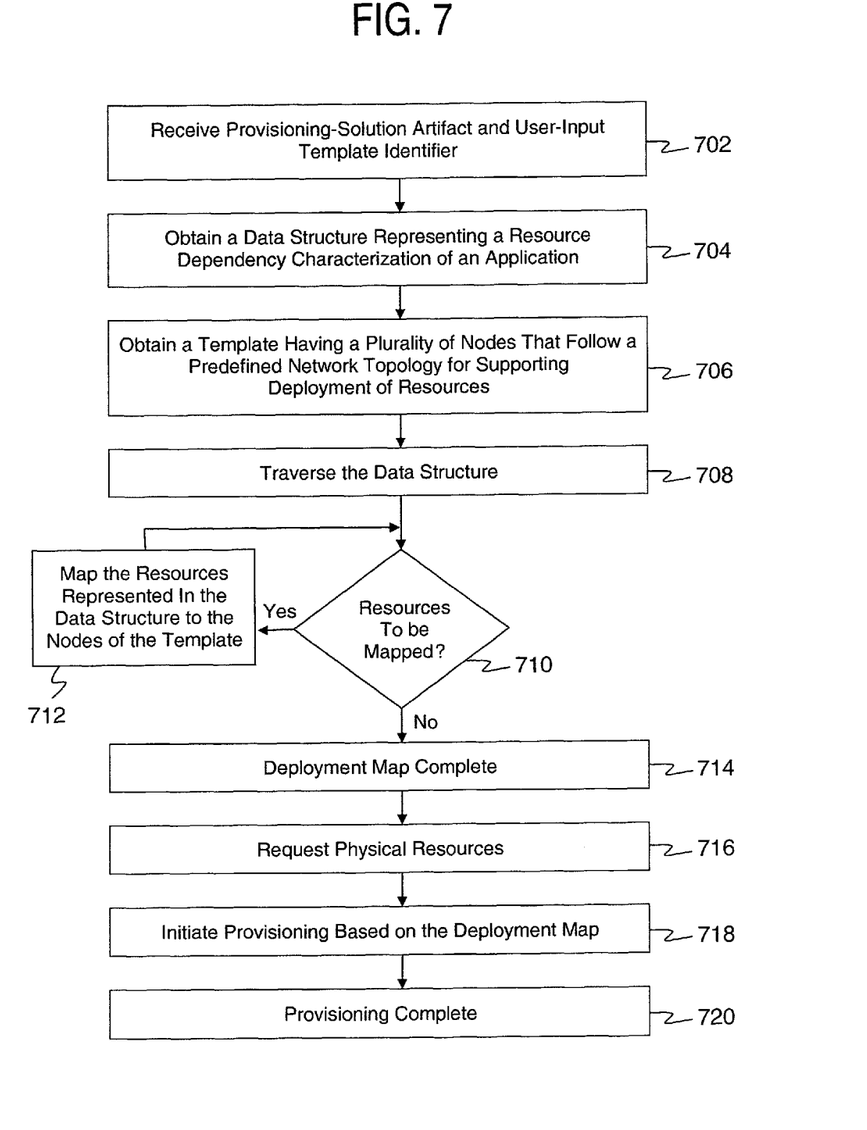
FIG. 7 is a flowchart illustrating a method for automated provisioning of computing resources in a distributed computing network, according to an exemplary embodiment of the present invention.

FIG. 7 is a flowchart illustrating a method for automated provisioning of computing resources in a distributed computing network, according to an exemplary embodiment of the present invention. Referring to FIG. 7, a provisioning-solution artifact and user-input template identifier are received, in step 702. For example, the provisioning-solution artifact may be a binary code that realizes a function of the application to be implemented. One or more provisioning-solution artifacts may be stored in a repository. A graphical user interface may be provided to allow a user to browse for a path to a provisioning-solution artifact and set the path.

In an exemplary embodiment of the present invention, a repository containing a plurality of templates is provided. A graphical user interface may be provided to allow a user to select a template identifier from a list of template identifiers for uniquely identifying each of the plurality of templates stored in the repository.

In step 704, a data structure representing a resource dependency characterization of an application to be implemented over a distributed computing network is obtained. The data structure may have a plurality of nodes indicative of a set of resources to be deployed. For example, the data structure may be a dependency graph.

In an exemplary embodiment of the present invention, a dependency graph is obtained by analyzing the provisioning-solution artifact to determine the dependency graph. For example, a dependency graph may be generated by introspection of the provisioning-solution artifact, which may contain modules such as portal applications, SCA modules, database DDL scripts, portal layout descriptors, J2EE applications, etc. During introspection, each module is identified and corresponding software components are noted to create a dependency graph for the provisioning-solution artifact. The dependency graph can then be used to map modules of the provisioning-solution artifact to the nodes.

In step 706, a template having a plurality of nodes that follow a predefined network topology for supporting deployment of the set of resources is obtained. For example, the template may be a directed graph in which the nodes represent functional capabilities and the edges represent communication paths. The template may be retrieved from a repository based on the user-input template identifier.

In step 708, the data structure is traversed. In step 710, it is determined whether there are resources remaining to be mapped from the data structure to the nodes of the template.

When it is determined that there are resources remaining to be mapped, resources represented in the data structure are mapped to the nodes of the template, in step 712. In an exemplary embodiment of the present invention, the resources represented in the data structure are mapped to the nodes of the template so as to satisfy a set of component requirements to generate a deployment map. Examples of component requirements include, but are not limited to, memory requirements, available free disk space, CPU speed, installed software components, and libraries. In an exemplary embodiment of the present invention, the component requirements are determined from the installation guides for different software components, and stored as meta data for each software component.

Mapping the resources represented in the data structure to the nodes of the template, in step 712, may include analysis of the component requirements as factors in determining appropriate mapping of resources represented in the data structure to the nodes of the template. For example, in the case where the WebSphere Application Server 526 requires at least 2 GB of memory, any resource that needs a WebSphere Application Server to run will need to be mapped to a node that supports the component requirements.

Once the mapping is complete in step 714, physical resources corresponding to the resources represented in the template nodes are requested, in step 716.

In step 718, a request may be submitted to initiate provisioning of the physical resources. A set of resources may be provisioned on a plurality of computers based on a deployment map to implement an application over the distributed computing network. For example, provisioning may include implementing changes for hardware, software, network and/or storage resources based on the mapping of resources represented in the data structure to the nodes of the template. In step 720, the provisioning of the computing resources is complete.

In an exemplary embodiment of the present invention, a system for automated provisioning of computing resources in a distributed computing network includes a memory device for storing a program of instructions, a processor in communication with the memory device, and a processor. The process is operative with the program of instructions to obtain a data structure representing a resource dependency characterization of an application to be implemented over the distributed computing network, wherein the data structure has a plurality of nodes indicative of a set of resources to be deployed, obtain a template having a plurality of nodes that follow a predefined network topology for supporting deployment of the set of resources, and map the set of resources represented in the data structure to the nodes of the template so as to satisfy a set of component requirements to generate a deployment map. The component requirements may be, for example, memory requirements, available free disk space, CPU speed, installed software components, and libraries. The component requirements may be determined from the installation guides for different software components, and stored as meta data for each software component. The processor is further operative with the program of instructions to provision the set of resources on the plurality of computers based on the deployment map to implement the application over the distributed computing network.

Figure 8:
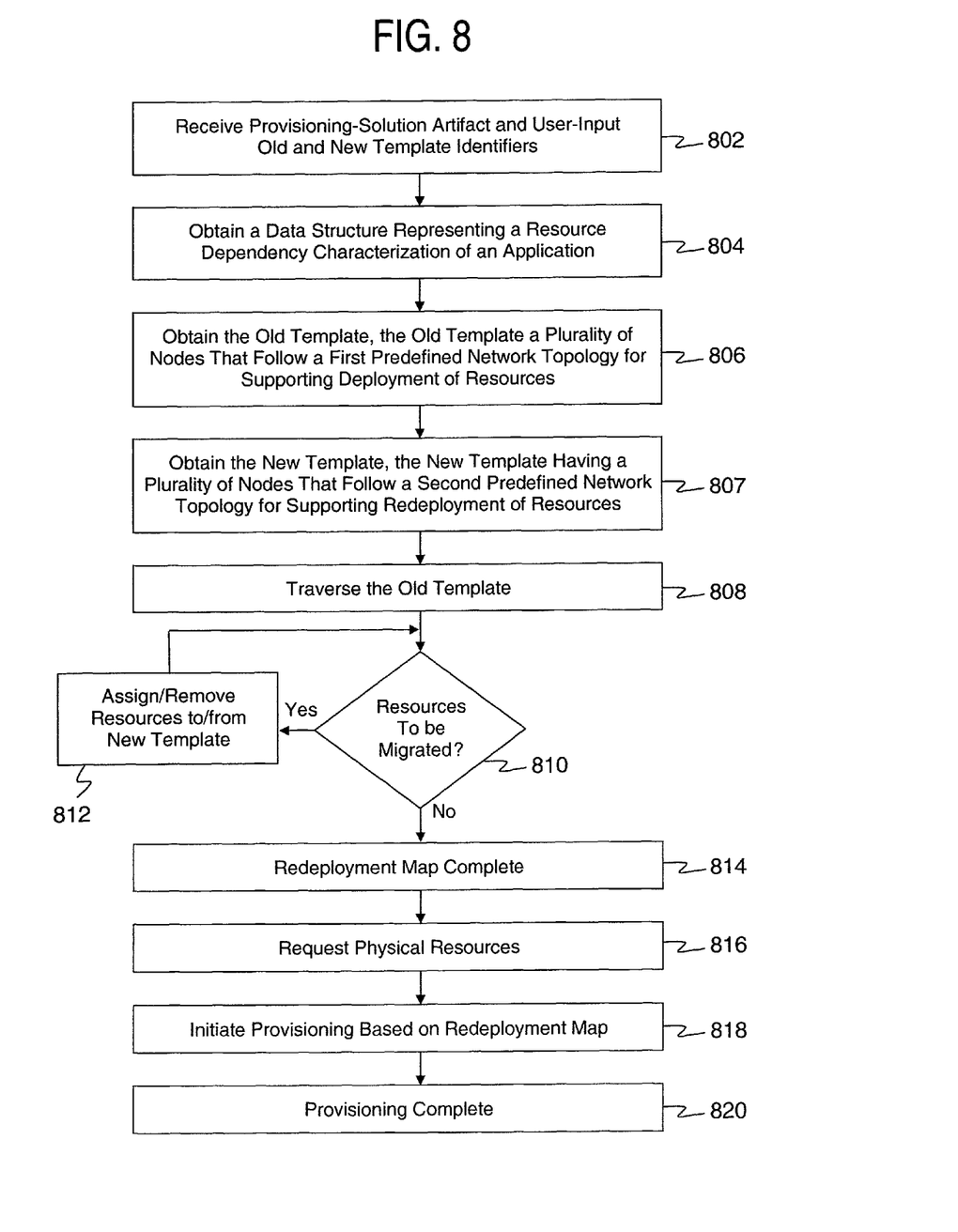
FIG. 8 is a flowchart illustrating method for automated provisioning of software components in a distributed computing network, according to an exemplary embodiment of the present invention.

FIG. 8 is a flowchart illustrating a method for automated provisioning of software components in a distributed computing network, according to an exemplary embodiment of the present invention. Referring to FIG. 8, a provisioning-solution artifact and user-selected old and new template identifiers are received, in step 802. For example, the provisioning-solution artifact may be a binary code that realizes a function of the application to be implemented.

In step 804, a data structure representing a resource dependency characterization of an application to be implemented over the distributed computing network is obtained. The data structure may have a plurality of nodes indicative of a set of resources to be deployed. The data structure may be, for example, a dependency graph.

In step 806, the old template having a plurality of nodes that follow a first predefined network topology for supporting deployment of a set of resources is obtained. In step 807, the new template having a plurality of nodes that follow a second predefined network topology for supporting redeployment of the set of resources is obtained. The old and new templates may be retrieved from a repository based on the user-input old and new template identifiers.

In step 808, the old template is traversed. It is determined whether there are resources remaining to be migrated from the old template to the nodes of the new template, in step 810.

When it is determined that there are resources remaining to be migrated, resources represented in the nodes of the old template are assigned to the nodes in the new template, in step 812. In the case where certain functionality is not supported in the new template, then certain component(s) may be ignored from the old template. In the case where some new functionality is introduced in the new template, then no mapping from the old template to the new template is performed with respect to the new functionality.

In step 814, the redeployment map is complete. In some cases, the resources represented in the nodes of the new template may be a subset of the resources represented in the old template. In some cases, the resources represented in the nodes of the new template may be a superset of the resources represented in the old template.

Next, in step 816, physical resources are requested for the resources represented in the new template. In step 818, provisioning of the resources based on the redeployment map is initiated. Provisioning may include implementing changes for hardware, software, network and/or storage resources based on information contained in the redeployment map.

In step 820, provisioning of the computing resources along with state to the new configuration based on the redeployment map is complete. The state of the component refers to the state stored in files and database tables that the component needs to resume function from the point where it was migrated. Prior to migration, the components are quiesced so that all the dynamic state is written to persistent storage, such as for example, files and database tables. After the state is migrated to the new nodes then the components can resume function from the point of suspension.

An example of the migration of computing resources in a distributed computing network, according to an exemplary embodiment of the present invention, will be described with reference to FIGS. 5, 6B and 6C. In this example scenario, the "Loan Solution" depicted in FIG. 5, which was previously assigned to template 604 of FIG. 6B, will be migrated to template 606 of FIG. 6C.

Referring to FIGS. 6B and 6C, any WebSeal specific configuration is migrated from the WebSeal node in template 604 to the WebSeal node in template 606. A single Portal Server configuration may be migrated from the Portal cluster in template 604 to a single Portal Server node in 606. Similarly, the Process Server, DB2, and router nodes may be migrated to the corresponding nodes in template 606. In this example, since there are no nodes in the template 604 corresponding to TAM and LDAP, no corresponding configuration information is migrated.

Figure 9:
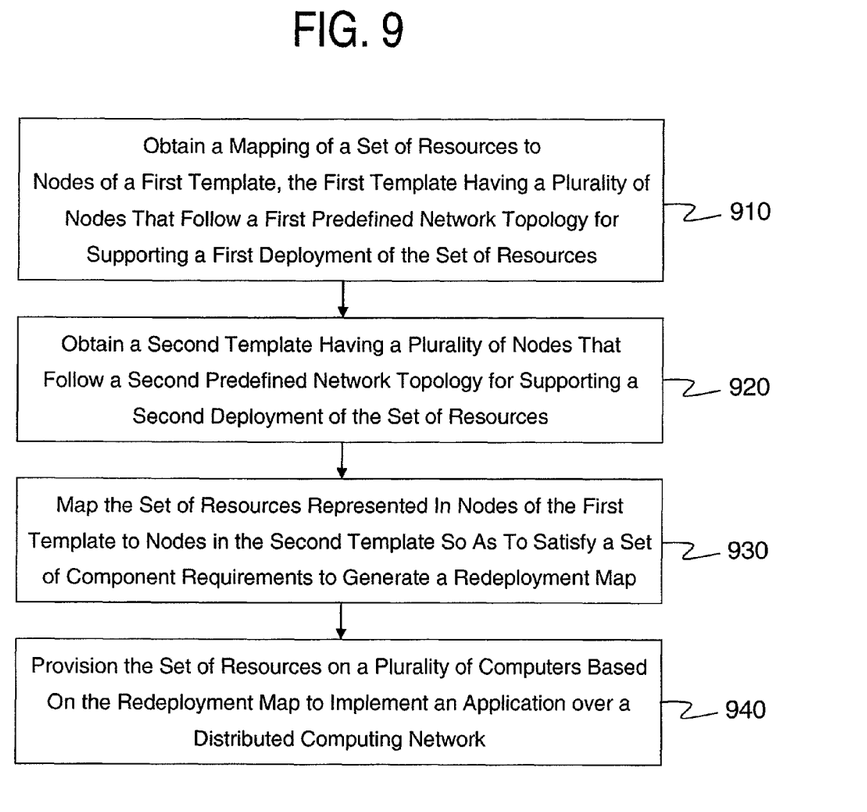
FIG. 9 is a flowchart illustrating method for automated provisioning of software components in a distributed computing network, according to an exemplary embodiment of the present invention.

FIG. 9 is a flowchart illustrating a method for automated provisioning of software components in a distributed computing network, according to an exemplary embodiment of the present invention. Referring to FIG. 9, in step 910, a mapping of a set of resources to nodes of a first template is obtained. The first template has a plurality of nodes that follow a first predefined network topology for supporting a first deployment of the set of resources. The first template may be a directed graph in which the nodes represent functional capabilities and the edges represent communication paths.

In step 920, a second template is obtained. The second template has a plurality of nodes that follow a second predefined network topology for supporting a second deployment of the set of resources. The second template may be a directed graph in which the nodes represent functional capabilities and the edges represent communication paths. The first and second templates may be retrieved from a repository based on user-input template identifiers.

In step 930, the set of resources represented in the nodes of first template are mapped to the nodes in the second template so as to satisfy a set of component requirements to generate a redeployment map. Examples of component requirements may include, but are not limited to, memory requirements, available free disk space, CPU speed, installed software components, and libraries. The component requirements may be determined from the installation guides for different software components, and stored as meta data for each software component.

In step 940, the set of resources is provisioned on a plurality of computers based on the redeployment map to implement the application over the distributed computing network.

In an exemplary embodiment of the present invention, a system for automated provisioning of software components in a distributed computing network includes a memory device for storing a program of instructions, and a processor in communication with the memory device. The processor is operative with the program of instructions to obtain a mapping of a set of resources to nodes of a first template, the first template having a plurality of nodes that follow a first predefined network topology for supporting a first deployment of a set of resources, obtain a second template having a plurality of nodes that follow a second predefined network topology for supporting a second deployment of the set of resources, and map the set of resources represented in the nodes of first template to the nodes in the second template so as to satisfy a set of component requirements to generate a redeployment map. The processor is further operative with the program of instructions to provision the set of resources on the plurality of computers based on the redeployment map to implement the application over the distributed computing network.

In an exemplary embodiment of the present invention, a repository containing a plurality of templates is provided. A graphical user interface may be provided to allow a user to select a template identifier from a list of template identifiers for uniquely identifying each of the plurality of templates stored in the repository. For example, obtaining the second template may include receiving a user-input second template identifier via the GUI, and retrieving one of the plurality of templates from the repository based on the user-input second template identifier.

Although exemplary embodiments of the present invention have been described in detail with reference to the accompanying drawings for the purpose of illustration and description, it is to be understood that the inventive processes and apparatus are not to be construed as limited thereby. It will be apparent to those of ordinary skill in the art that various modifications to the foregoing exemplary embodiments may be made without departing from the scope of the invention as defined by the appended claims, with equivalents of the claims to be included therein.

What is claimed is:

1. A method for automated provisioning of software components in a distributed computing network, the method comprising:

receiving a plurality of provisioning-solution artifacts, each provisioning-solution artifact including a software component that realizes a function of an application, wherein the application comprises a plurality of different software components;

analyzing the provisioning-solution artifacts to determine a dependency graph representing a resource dependency characterization of the software components of the application;

obtaining a mapping of a set of resources and the provisioning-solution artifacts to nodes of a first template, the first template having a plurality of nodes that follow a first predefined network topology for supporting a first deployment of the set of resources;

obtaining a second template having a plurality of nodes that follow a second predefined network topology for supporting a second deployment of the set of resources and the provisioning-solution artifacts;

obtaining state information for each of the software components; migrating the set of resources represented in the nodes of the first template to the nodes in the second template so as to satisfy a set of component requirements to generate a redeployment map;

provisioning the set of resources and the provisioning-solution artifacts on a plurality of computers according to the redeployment map and the resource dependency characterization to implement the software components of the application over the distributed computing network, wherein each of the software components resumes a respective function according to the state information, and wherein the first template and the second template are directed graphs in which the nodes represent functional capabilities of resources and the edges represent communication paths.

2. A method for automated provisioning of software components in a distributed computing network, the method comprising:

receiving a plurality of provisioning-solution artifacts, each provisioning-solution artifact including a software component that realizes a function of an application, wherein the application comprises a plurality of different software components;

analyzing the provisioning-solution artifacts to determine a dependency graph representing a resource dependency characterization of the software components of the application;

obtaining a mapping of a set of resources and the provisioning-solution artifacts to nodes of a first template, the first template having a plurality of nodes that follow a first predefined network topology for supporting a first deployment of the set of resources;

obtaining a second template having a plurality of nodes that follow a second predefined network topology for supporting a second deployment of the set of resources and the provisioning-solution artifacts;

obtaining state information for each of the software components; migrating the set of resources represented in the nodes of the first template to the nodes in the second template so as to satisfy a set of component requirements to generate a redeployment map;

provisioning the set of resources and the provisioning-solution artifacts on a plurality of computers according to the redeployment map and the resource dependency characterization to implement the software components of the application over the distributed computing network, wherein each of the software components resumes a respective function according to the state information, and wherein the set of component requirements are analyzed to determine the migration of the resources represented in the nodes of the first template to the nodes of the second template.

3. A method for automated provisioning of software components in a distributed computing network, the method comprising:

receiving a plurality of provisioning-solution artifacts, each provisioning-solution artifact including a software component that realizes a function of an application, wherein the application comprises a plurality of different software components;

analyzing the provisioning-solution artifacts to determine a dependency graph representing a resource dependency characterization of the software components of the application;

obtaining a mapping of a set of resources and the provisioning-solution artifacts to nodes of a first template, the first template having a plurality of nodes that follow a first predefined network topology for supporting a first deployment of the set of resources;

obtaining a second template having a plurality of nodes that follow a second predefined network topology for supporting a second deployment of the set of resources and the provisioning-solution artifacts;

obtaining state information for each of the software components; migrating the set of resources represented in the nodes of the first template to the nodes in the second template so as to satisfy a set of component requirements to generate a redeployment map;

provisioning the set of resources and the provisioning-solution artifacts on a plurality of computers according to the redeployment map and the resource dependency characterization to implement the software components of the application over the distributed computing network, wherein each of the software components resumes a respective function according to the state information;

obtaining the state information for each of the software components further comprises:
quiescing the software components; and
writing the state information to a persistent storage.

4. A data processing system configured to automatically provision software components, the system comprising:

a memory device storing a program of instructions; a distributed computing network comprising a plurality of host computers;

a processor in communication with the host computers, the processor operative with the program of instructions to:

receive a plurality of provisioning-solution artifacts, each provisioning-solution artifact including a software component that realizes a function of an application, wherein the application comprises a plurality of different software components;

analyze the provisioning-solution artifacts to determine a dependency graph representing a resource dependency characterization of the software components of the application;

obtain a mapping of a set of resources and the provisioning-solution artifacts to a first set of nodes of a first template, the first nodes of the first template representing the host computers of the distributed computing network and having a first predefined network topology for supporting a first deployment of a set of resources;

obtain a second template comprising a second set of nodes having a second predefined network topology and representing the host computers of the distributed computing network for supporting a second deployment of the set of resources and the provisioning-solution artifacts;

obtain state information for each of the software components from the host computers; migrate the set of resources represented in the first template to the second template so as to satisfy a set of component requirements to generate a redeployment map;

provision the set of resources and the provisioning-solution artifacts on the host computers of the distributed computing network according to the redeployment map and the resource dependency characterization to implement the software components of the application over the host computers of the distributed computing network, wherein each host computer implementing a software component according to the redeployment map receives the state information of a respective software component and resumes the function of the respective software component according to the state information; and wherein the processor is operative with the program of instructions to quiesce the software components prior to obtaining the state information for each of the software components and write the state information to a persistent storage.

* * * * *